United States Patent [19]
Perry

[11] Patent Number: 5,347,645
[45] Date of Patent: Sep. 13, 1994

[54] TIME CODE INTERFACE

[75] Inventor: James D. Perry, Tiverton, R.I.

[73] Assignee: The United States of America as represented by the Secretary of the Navy, Washington, D.C.

[21] Appl. No.: 813,563

[22] Filed: Dec. 26, 1991

[51] Int. Cl.$^5$ .............................................. G06F 1/04
[52] U.S. Cl. ................................. 395/550; 395/250
[58] Field of Search ....................... 395/275, 550, 250; 377/44, 26, 20, 39, 52; 340/172.5; 328/129, 48, 58; 307/265, 220, 293; 365/73, 189; 364/239, 239.1, 270, 271.5

[56] References Cited
U.S. PATENT DOCUMENTS

| | | | |
|---|---|---|---|
| 3,651,486 | 3/1972 | Abrahamsson | 340/172.5 |
| 4,435,827 | 3/1984 | Kuze | 377/44 |
| 4,470,140 | 9/1984 | Coffey | 370/86 |
| 4,882,475 | 11/1989 | Miller et al. | 235/383 |

Primary Examiner—Dale M. Shaw
Assistant Examiner—Sang H. Mike Kim
Attorney, Agent, or Firm—Michael J. McGowan; Prithvi C. Lall; Michael F. Oglo

[57] ABSTRACT

A modularized Time Code Interface (TCI) used to time tag asynchronous events. Input and output connectors provide modularity in that the TCI may be readily plugged into or removed from a system. The TCI utilizes programmable memory for storing time intervals that are used in producing time of day data associated with the occurrence of an asynchronous event.

5 Claims, 3 Drawing Sheets

TIME CODE INTERFACE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

A Time Code Interface (TCI) is used to provide the necessary timing information to external signal processors in order to generate target pulse widths, target pulse arrival times and lead words. (Leadwords provide the time of day in hours, minutes and seconds at predetermined intervals). The timing information for generation of the leadword is obtained from a Time Code Generator (TCG). Typically, an internally generated synchronization signal is synchronized with an externally generated 100 Kilo-pulses per second signal at a predetermined interval of time in order to generate a transfer signal. The transfer signal then transfers the leadword information from the TCG to the signal processing device. Typically, the TCI is hardwired within the signal processing devices.

(2) Description of the Prior Art

In U.S. Pat. No. 4,078,234, issued Mar. 7, 1978 entitled, "Continuous Wave Correlation Radar System" to Fishbein et al., there is described a continuous wave (CW) radar system in which the CW signal is simultaneously sinusoidally frequency-modulated and pseudo-random phase-modulated. The system includes means for generating a first, p-bit, pseudo-random binary code and means for phase-modulating a continuous wave microwave energy source with the first pseudo-random code. The system also includes means for generating a sinusoidal signal of a first frequency and means for frequency-modulating the microwave source with the first frequency. The system also includes means for generating a second, psuedo-random code which corresponds to the first code but which is delayed in time with respect thereto by a predetermined amount, and means connected to the means for deriving the video-frequency signal and to the second code generating means, for correlating the delayed version of the first code with the second code.

In U.S. Pat. No. 4,203,115, issued May 13, 1980 entitled, "Zero-Doppler Shift Positioning Technique" to Hannigan, there is described a system for determining the time at which a specific Doppler frequency occurs. A sampling time code is passed through a voltage limit sensor to a pulse triggering circuit which also serves as a buffer for interfacing with a data storage device. The pulse triggering circuit provides a series of pulses which are stored in the data storage device. Simultaneously, the time code is also stored in the data storage device for correlation with the pulses to set boundaries on the time of zero doppler or any other doppler frequency desired. These trigger pulses correspond to the time code and also provide a finer resolution of both the doppler signal and a finer resolution of the time at which the doppler signal was received.

In U.S. Pat. No. 4,238,785, issued Dec. 9, 1980 entitled, "Zero-Doppler Shift Positioning Technique", to Hannigan, a divisional application of U.S. Pat. No. 4,203,115, there is described a system for locating forward observation posts with respect to a base station. An artillery projectile or missile in flight emits a single continuous carrier frequency symmetrically modulated by a relative time code. The frequency emitted from the projectile or missile is doppler shifted above or below its basic frequency due to the velocity of the projectile. This doppler signal always goes through its basic frequency or zero doppler at a point which is representative of and identifies an observer's position in the horizontal or subtrack direction of the projectile. The relative time at which this zero doppler occurs for each observer is obtained from a time code transmission. The observer's position is provided with a means for storing this time code information. This time code is also used to identify the position of the projectile at any time during its flight.

In U.S. Pat. No. 4,797,677, issued Jan. 10, 1989, entitled, "Method and Apparatus for Deriving Pseudo Range From Earth-Orbiting Satellites", to MacDoran et al., there is described an apparatus that permits a user to derive his pseudo range from earth-orbiting, signal-transmitting satellites without knowledge of the code sequence of modulation carried by the signal, if any. In one embodiment of the invention, an omnidirectional antenna intercepts the signal from all the satellites in view at one time. The antenna is coupled to a radio receiver to recover selected components of the satellite signals. The radio receiver produces a sub-audio output signal which is connected to a clock interface unit, where the sub-audio signal is sampled, converted to digital form, and time tagged to identify the precise time at which each sample is taken. The time tagged digital samples are coupled to a digital computer where various functions are performed.

In U.S. Pat. No. 4,803,489, issued Feb. 7, 1989, entitled, "Method For Detecting A Camouflaged Object And System", to Giori, there is described a method and system for detecting an object hidden behind and/or under various combinations of optical and/or radar camouflage. The invention includes a pulsed radar system whose operation is initiated by a synchronizer or timing logic which, in general, controls the time sequence of transmissions, receiver gates and gain settings, and signal processing and display. The timing logic preferably includes a master clock and divider chain to provide the appropriate timing for recording radar returns without signal interference. To obtain location of the camouflaged object or objects, an aircraft location with respect to ground benchmarks is determined as a function of time. The straightforward trigonometric operation of adding the aircraft vector to that of the camouflaged object can be carried out either (i) in real time in the aircraft, or (ii) can be done later from time synchronized data. This data can be provided by a ground reference navigation system, such as INS, Doppler radar, GPS or other ground reference navigation systems. Accurately time-tagged aircraft location can be obtained from military tracking radars or from Air Force radar bomb sight tracking radars.

SUMMARY OF THE INVENTION

The improved Time Code Interface (TCI) of the invention resides in a stand alone Time Code Generator (TCG). Input and output connectors provide modularity so that the TCI may be plugged into or removed from the whole system easily. The TCI uses signals derived from the Time Code Generator. If other multiple locations use a TCI, internal handshake signals are derived at each individual location and do not rely on long distance coupling from a master location; this results in higher accuracy and reliability. Also due to this modularity, any repairs and/or redesign to the TCI can be made solely to the TCI and will not impact external signal processor devices or result in major system reconfiguration.

An aspect of the present invention is that the TCI can be utilized in various systems that require time-tagging of asynchronous events by varying the timing interval used in generating timing information necessary for time tagging or time stamping, i.e., day of the month, time of day in hours, minutes and seconds. This is accomplished by inserting a memory device containing new timing information into the TCI, or by reprogramming the memory to another desired interval. The utilization of a memory device to store time values adds a higher level of accuracy in producing time information at an exact predetermined interval. Greater accuracy, reliability and stability in obtaining the necessary timing information is provided with the improved TCI.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
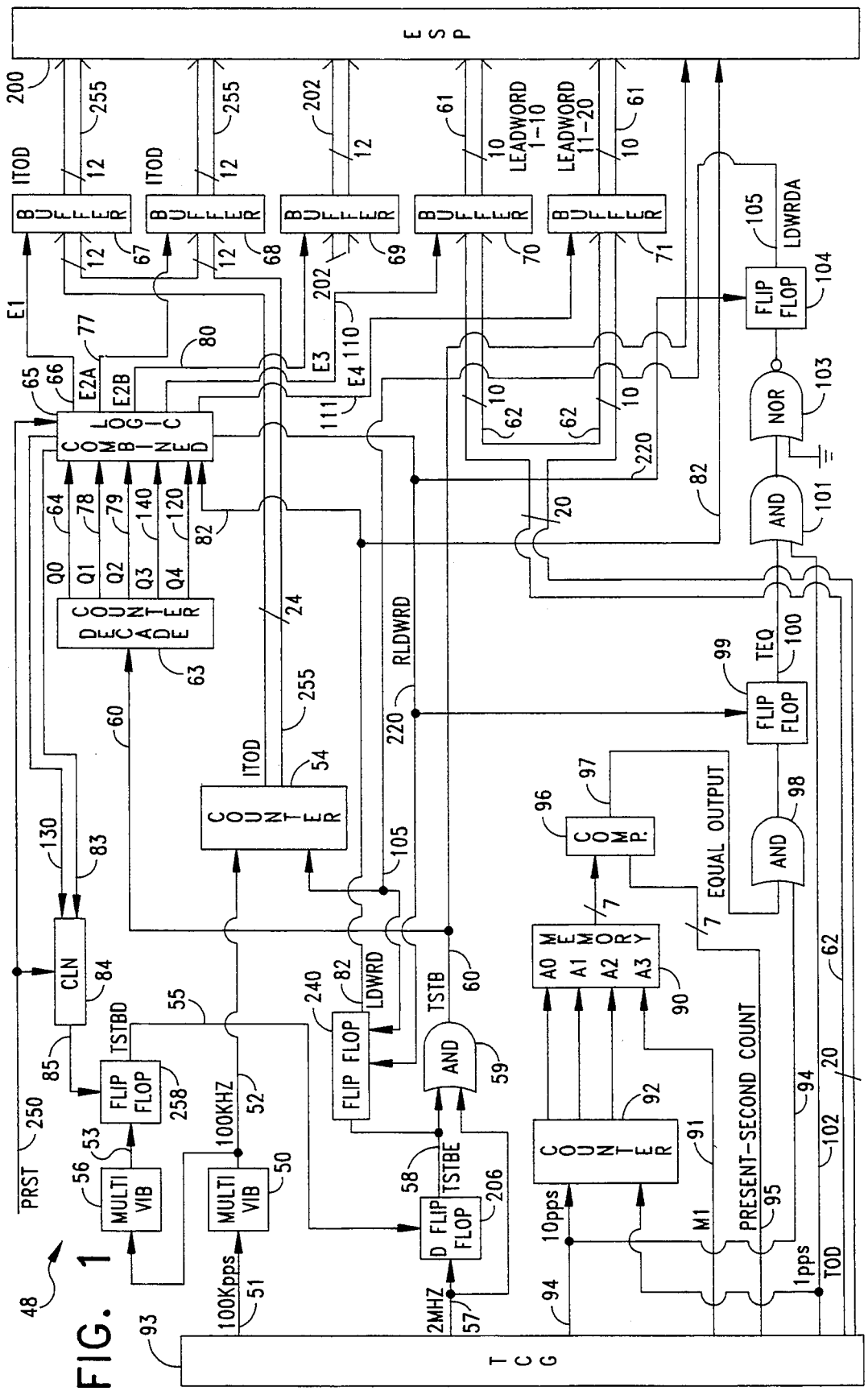
FIG. 1 is a block diagram illustrating the TCI.

Referring now to FIG. 1, a digital electronics circuit, all-inclusively designated Time Code Interface (TCI) 48, receives a digital time of day signal (TOD—in hours, minutes and seconds) 62 from a circuit designated a Time Code Generator (TCG) 93. TCI 48 performs interfacing functions in accordance with the present invention in delivering, or supplying, TOD 62 to an external signal processor (ESP) 200. It also supplies an interpolated time of day (ITOD-in tens of microseconds within a range of 0 to 800000) that it generates internally. Furthermore, it generates a 100 kHz 52.

Figure 2:
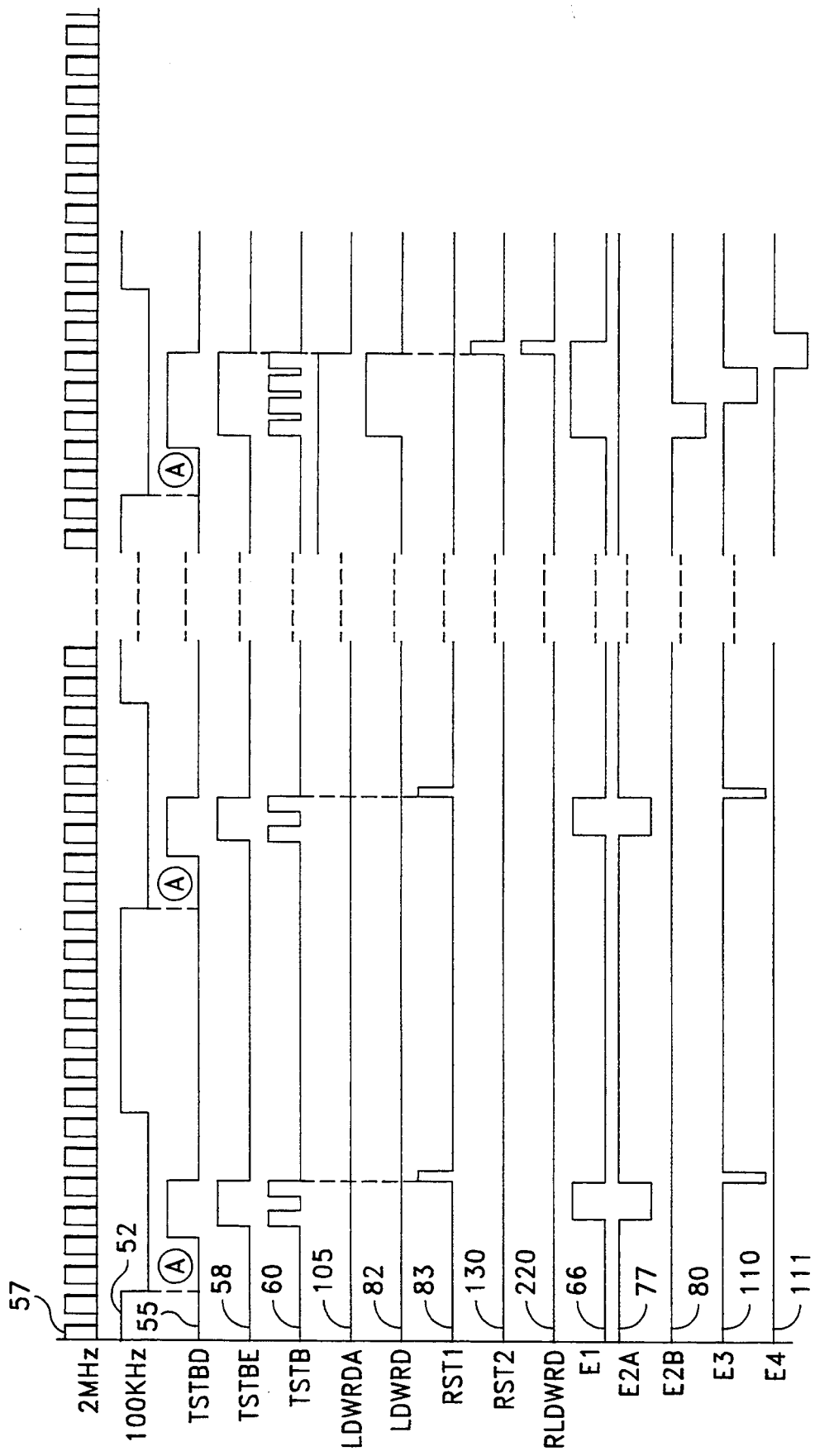
FIG. 2 is a timing diagram of the TCI.
Figure 3:
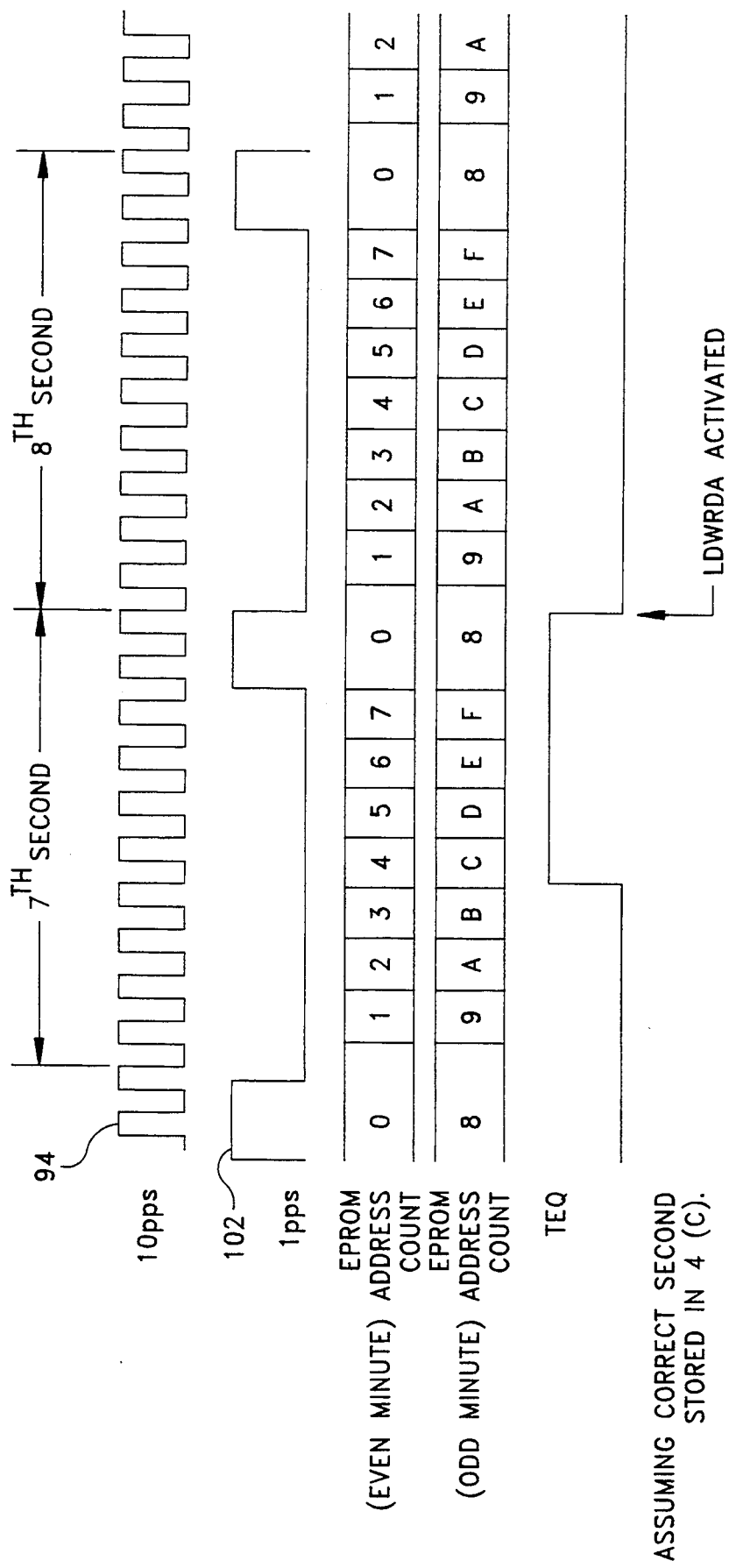
FIG. 3 is a timing diagram of the time interval-generating circuitry.

A block diagram of the TCI appears in FIG. 1 and the signals that are used by the TCI are shown in the timing diagram of FIG. 2. Referring to FIG. 1, a monostable multivibrator 50 accepts a 100 Kpps signal 51 from the TCG 93 to produce a 100 KHz signal 52 (50/50 duty cycle) as its output. The negative edge of this 100 kHz signal 52 increments a binary counter 54 that produces the interpolated time of day (ITOD) signal 255. A second monostable multivibrator 56 also triggers on the negative edge of the 100 KHz signal 52 and provides a delayed output 53 which is coupled to a D-flip-flop 258 before triggering TSTBD (time strobe disable) 55 high. TSTBD 55 allows the rising edge of a next clock pulse of a 2 MHz oscillator 57, coupled to a second D-flip-flop 206, to raise TSTBE (time strobe enable) 58. TSTBE 58 and the 2 MHz oscillator 57 are coupled to the input of AND-gate 59 which outputs TSTB (time strobe) 60. TSTB 60 is a handshake strobe sent to an external signal processor (ESP) 200 to allow data to be stored within ESP 200. Depending on whether a "Leadword" condition exists, it is determined what type of data the ESP 200 will store, either ITOD 255 or TOD 62. The relationship of the Leadword condition to the sequence of operation of the TCI 48 will become apparent from later descriptions herein. For now, it is assumed that no Leadword condition exists (Leadword signal LDWRD 82 is a logic low).

A decade counter 63 is used to sequentially enable output buffers 67–71. The QO output 64 of decade counter 63 is coupled to an input of a combinational logic network (CLN) 65. When the decade counter 63 is in a reset state, the QO output 64 is a logic high causing the combinational logic network 65 to emit a first enable signal E1 66 as a logic low. This causes tri-state buffer 67 to be enabled. The outputs of buffers 67–71 comprise the twelve data lines that are fed to the ESP 200. The enabling and disabling of the buffers 67–71 governs what data the ESP 200 will receive during a particular TSTB 60. As a result of the first buffer 67 becoming enabled during the first TSTB 60, the first ten bits of ITOD 255 are sent to the ESP 200. On the falling edge of the first TSTB 60, decade counter 63 increments and the QO output 64 is now low, causing the first enable signal E1 66 to be high. The Q1 output 78 of decade counter 63, is coupled to an input of the CLN 65. When Q1 78 is high, the CLN 65 emits a logic low second enable signal E2A 77 which enables buffer 68. Therefore, the last 10 bits of ITOD 255 are sent to the ESP 200. (no Leadword condition 82 exists at present).

On the falling edge of the second TSTB 60, the Q1 output 78 is a logic low. This causes the CLN 65 to emit a logic high second enable signal which disables buffer 68. The Q2 output 79 of decade counter 63 is coupled to CLN 65. The leadword signal (LDWRD) 82 is also coupled to CLN 65 and is a logic low when there is no leadword condition present. When the Q2 output 79 is high, the third enable signal E2B 80 is low which enables buffer 69. When LDWRD 82 is low and Q2 output 79 is high, CLN 65 emits a logic high reset signal RST1 83 which is coupled to an input of CLN 84. In response to a logic high reset signal RST1 83, CLN 84 emits a reset signal 85 which resets the D-flip-flop 258. This creates a logic low TSTBD output signal 55 which in turn resets D-flip-flop 206 which emits a logic low TSTB signal 60. A low state on TSTBD 55 causes a clear condition of flip-flop 206 which lowers TSTBE 58, thus disabling generation of TSTB signal 60. TSTB signal 60 resets decade counter 63 causing CLN 65 to emit a logic low reset signal 83, raises the logic level of the third enable signal E2B 80 thereby disabling buffer 69 and lowers the logic level of the first enable signal E1 66, thereby enabling buffer 67. The next negative edge of the 100 kHz signal 52 repeats the process. Thus, every ten microseconds the TCI supplies the ESP 200 with the ITOD signal 255. The ITOD 255 is provided in tens of microseconds within a range of zero to eight seconds. The rollover at the end of the seventh second and the beginning of the first second is synchronized with the generation of a 24 bit Leadword signal 61. A Lead Word 61 provides the time of day in hours, minutes and seconds, at eight second intervals.

The generation of a Leadword Alert 105 alerts the TCI circuitry that a Lead Word condition exists (i.e., one of the eight second intervals is about to rollover) prior to the next ten microsecond cycle that occurs after the rollover. This is accomplished by storing the binary equivalents of the second-before times of all possible eight second intervals within a memory 90, such as an EPROM. This stored data is then scanned every second for a match with the present time. The address lines of memory 90 are comprised of the least significant bit of the minute count signal (M1) 91 (received from the TCG 93) and the three least significant bits of a binary counter 92. M1 91 is the most significant bit of the address of the memory 90 and determines an address range of the memory 90 that is scanned during a particular minute. In this particular application, the least significant four address bits are used, hence, only 16 memory locations contain time values. If the current minute is even, M1 91 is low, and address locations 0000 to 0111 are scanned. If the current minute is odd, M1 91 is high, and address locations 1000 to 1111 are scanned. The time value of each memory location within locations 0000 to 0111 is expressed as (N*I)−1 where N is an integer ranging from one to the maximum number of address locations scanned during an even minute, and I is a predetermined interval of time at which a Leadword signal is to be generated and (*) denotes multiplication.

In this particular application, eight second intervals are desired, hence Leadword signal 61 is generated at 0, 8, 16, 24, 32, 40, 48 and 56 seconds.

The time value of each memory location within locations 1000 to 1111 is expressed as (N*I)−5 where N is an integer ranging from one to the maximum number of address locations scanned during an odd minute, I is the predetermined interval of time at which a Leadword signal is to be generated and (*) denotes multiplication.

For eight second intervals, a Leadword signal 61 is generated at 4, 12, 20, 28, 36, 44, and 52 seconds.

Reference is made to Table 1, set forth as follows, which illustrates memory 90 addresses and contents.

| ADDRESS | DATA |
|---------|------|
| 000 | 07 |
| 001 | 15 |
| 002 | 23 |
| 003 | 31 |
| 004 | 39 |
| 005 | 47 |
| 006 | 55 |
| 007 | FF |
| 008 | 03 |
| 009 | 11 |
| 00A | 19 |
| 00B | 27 |
| 00C | 35 |
| 00D | 43 |
| 00E | 51 |
| 00F | 59 |
| 010–7FF | FF |

The TCI also provides a twelve bit Special Event Code 202 that it receives from external switch settings. The Special Event Code 202 is currently employed as a binary representation of the day of the month. Generation of a Lead Word 61 will now be discussed in detail.

A 10 pps signal 94 from the TCG 93 increments binary counter 92, the output of which, when combined with the M1 signal 91, addresses the memory locations of memory 90. The outputs of memory 90 are compared to a present second count signal 95, which represents the current time, received from the TCG 93. When the present second count 95 equals the time interval stored in one of the address locations of memory 90, an equal output signal 97 of comparator 96 shifts to a logic high level. The equal output signal 97 is coupled to an input of AND-gate 98. The 10 pps signal 94 is also coupled to an input of AND-gate 98. The output of AND-gate 98 is coupled to flip-flop 99. Upon the next rising edge of the 10 pps signal 94, flip-flop 99 is triggered to raise the TEQ signal 100, which coupled to an input of AND-gate 101. A 1 pps signal 102 is also coupled to an input of AND-gate 101, the output of which is coupled to an input of NOR-gate 103. The output of NOR-gate 103 is coupled to an input of flip-flop 104. On the falling edge of the next pulse (of the 1 pps signal 102) flip-flop 104 is triggered to raise the LDWRDA (Lead Word Alert) signal 105. The 1 pps signal 102 also resets binary counter 92 to allow a full count cycle for the next second. LDWRDA 105 resets the binary counter 54 that provides the ITOD signal 255 and also triggers flip-flop 240 creating a logic high Lead Word condition signal LDWRD 82 at the next ten microsecond cycle, when flip-flop 240 is strobed by the TSTBE signal 58. LDWRD 82 is transmitted to the ESP 200 to give notice that a Leadword condition exists.

During a Leadword condition (LDWRD is a logic high), four bytes of time data are passed from the TCI to the ESP 200. The first byte of time data is the first ten bits of ITOD 255, as in the non-Lead Word scenario, except now they are all zeros since LDWRDA 105 resets the binary counters. The falling edge of the first TSTB 60 increments the decade counter 63 as before, but because of LDWRD 82 being set, the third enable signal E2B 80, not the second enable signal E2A 77, is low, hence buffer 69 is enabled. Buffer 69 provides the Special Event Code 202. On the falling edge of the second TSTB 60 decade counter 63 is incremented, the third enable signal E2B 80 is high, the fourth enable signal E3 110 is low, and buffer 70 is enabled. The reset signal RST1 83 is not set this time due to LDWRD 82 being set. Hence, a third TSTB 60 is generated, and the first ten bits of TOD 62 are sent to the ESP 200. The decade counter 63 is incremented again on the falling edge of the third TSTB 60. The fourth enabled signal E3 110 shifts to a logic high, and the fifth enable signal E4 111 shifts to a logic low thereby enabling buffer 71 which allows the last ten bits of TOD 62 to pass through to the ESP 200. On the falling edge of the fourth TSTB 60, the decade counter 63 is incremented thereby causing the Q4 signal 120, which is coupled to an input of CLN 65, to shift to a logic high level. When the Q4 output 120 is a logic high, CLN 65 emits a logic high second reset signal RST2 130, which causes the same reset conditions as the first reset signal RST1 83, as well as emitting a logic high level RLDWRD signal 220. A logic high RLDWRD signal 220 causes the LDWRDA signal 105, the LDWRD signal 82, and the TEQ signal 100 to shift to a logic low to be ready for the next Leadword condition (high logic level LDWRD 82) eight seconds later. When the decade counter 63 resets via the second reset signal RST2 130, both the second reset signal RST2 130 and the RLDWRD 220 are shifted to a logic low.

The TCI is supplied with a power-on reset (PRST) signal 250 which initializes the TSTBD signal 55 (and hence TSTBE 58) and the RLDWRD signal 220, which insures proper synchronization of the ten microsecond cycles and the proper Lead Word 61 intervals.

An advantage of the TCI is realized through the utilization of the input and output connectors which provide modularity. That is, the TCI may be easily plugged into or removed from a system. This feature makes fault isolation between the TCI and other system hardware less difficult and decreases downtime necessary for system trouble shooting. Any repairs and/or redesign to the TCI can be made solely to the TCI, without impacting the internal circuitry of other system hardware.

The TCI is useful for other types of systems that require time-tagging asynchronous events. The timing interval used in producing the time of day may be varied by reprogramming the on-board EPROM to another desired interval. Utilization of the EPROM to store time values adds a higher level of accuracy in producing the time of day that is associated with an asynchronous event. The EPROM may be reprogrammed off-line by an external microcomputer or it may be physically removed from the TCI and inserted into a programmer to receive new timing information.

The present invention is directed to time tagging asynchronous events, therefore the output data corresponds to time information. However, the invention can be utilized where any type of digital information must be transferred to peripheral devices at specified time intervals.

The preferred embodiment employs an EPROM for the memory 90, however other programmable memory devices may also be used, such as a RAM (random access memory), or a bipolar prom (programmable read only memory).

Thus, based on the foregoing teaching those having ordinary skill in the art may derive a number of modifications to the embodiments of the invention disclosed above. The invention is therefore not to be construed to be limited only to these disclosed embodiments, but it is instead intended to be limited only as defined by the breadth and scope of the appended claims.

What is claimed is:

1. An apparatus for associating a time with an event, comprising:

first counter means for receiving a first repetitive clock signal of a first frequency, said first counter means counting the first repetitive clock signal for a predetermined interval of time, said first counter means outputting a first multi-bit digital signal representing a duration of said predetermined interval of time;

buffer means having an input for receiving a second multi-bit digital signal representing a current time of day (TOD), said second multibit digital signal having a lesser degree of resolution than said first multibit digital signal;

second counter means for receiving a second repetitive clock signal of a second frequency, said second frequency being less than said first frequency;

storage means having a first plurality and a second plurality of addressable locations, said storage means having a plurality of least significant address inputs coupled to an output of said second counter means and at least one most significant bit address input coupled to a signal expressive of a repetitively reoccurring time interval having a first logic state and a second logic state, said storage means storing at each location within said first and said second plurality of addressable locations a value expressive of a time, said storage means being responsive to the state of said repetitively reoccurring time interval and to said plurality of least significant address inputs to form a multi-bit address for reading out a stored value expressive of a time;

comparison means having a first input coupled to an output of said storage means and a second input coupled to a time signal expressive of a current time, said comparison means comprising means for comparing said output of said storage means to said time signal expressive of a current time and for asserting a control signal in response to the time signal equaling said stored value being outputted by said storage means, said control signal being coupled to said buffer means for causing said output of said buffer means to be enabled, said control signal being further coupled to said first counter means for resetting said first counter means, and said control signal also being coupled to said buffer means for enabling said buffer means; and sequencing means including a counter circuit, said sequencing means serving to sequence the addresses of the storage means and having a first input coupled to said second repetitive clock signal and a second input coupled to a third repetitive clock signal wherein said third repetitive clock signal has a frequency that is less than that of said first and second repetitive clock signals.

2. The apparatus of claim 1 wherein said TOD signal has a resolution in hours, minutes and seconds.

3. The apparatus of claim 1 wherein said first multi-bit digital signal representing an amount of time elapsed has a resolution in microseconds.

4. The apparatus of claim 1 wherein the value expressive of a time at each location within said first plurality of addressable locations is expressed as (N*I)−1, where N is an integer ranging from 1 to the maximum number of address locations in said first plurality of address locations, and I is a predetermined interval of time at which timing information is to be generated, and where (*) denotes multiplication.

5. The apparatus of claim 1 wherein the value expressive of a time at each location within said second plurality of addressable locations is expressed as (N*I)−5, where N is an integer ranging from 1 to the maximum number of address locations in said second plurality of address locations, and I is a predetermined interval of time at which timing information is to be generated and where (*) denotes multiplication.

* * * * *